US012612327B2

(12) United States Patent
Lee et al.

(10) Patent No.: US 12,612,327 B2
(45) Date of Patent: Apr. 28, 2026

(54) METHOD FOR MANUFACTURING MICROCHANNEL PLATE

(71) Applicant: Woonkyung Lee, Seongnam-si (KR)

(72) Inventors: Woonkyung Lee, Seongnam-si (KR);
Byung Hun Lee, Seongnam-si (KR)

(73) Assignee: Lee Woonkyung, Seongnam-si (KR)

( * ) Notice: Subject to any disclaimer, the term of this patent is extended or adjusted under 35 U.S.C. 154(b) by 178 days.

(21) Appl. No.: 18/427,861

(22) Filed: Jan. 31, 2024

(65) Prior Publication Data

US 2024/0300844 A1    Sep. 12, 2024

(30) Foreign Application Priority Data

Mar. 9, 2023    (KR) ......................... 10-2023-0030990

(51) Int. Cl.
| | |
|---|---|
| *C03B 37/028* | (2006.01) |
| *C03B 23/207* | (2006.01) |
| *C03B 37/012* | (2006.01) |
| *H01J 43/24* | (2006.01) |

(52) U.S. Cl.
CPC .......... *C03B 37/028* (2013.01); *C03B 23/207* (2013.01); *C03B 37/01214* (2013.01); *H01J 43/246* (2013.01); *C03B 2203/40* (2013.01)

(58) Field of Classification Search
CPC ........................... H01J 43/246; C03B 2203/40
See application file for complete search history.

(56) References Cited

U.S. PATENT DOCUMENTS

| | | | | |
|---|---|---|---|---|
| 3,669,639 A | * | 6/1972 | Inoue | ...................... C03B 37/15 |
| | | | | 385/115 |
| 5,108,961 A | * | 4/1992 | Zhong | ..................... C03C 3/108 |
| | | | | 501/78 |
| 6,066,020 A | * | 5/2000 | Devoe | ............... C03B 37/01214 |
| | | | | 313/105 CM |
| 6,183,329 B1 | * | 2/2001 | Cathey | .................. H01J 31/123 |
| | | | | 445/24 |

(Continued)

FOREIGN PATENT DOCUMENTS

| | | | | |
|---|---|---|---|---|
| EP | 1516861 A2 | * | 3/2005 | ............. B65H 54/36 |
| EP | 1667838 B1 | | 11/2010 | |

(Continued)

OTHER PUBLICATIONS

User108308, Calculate the radius of a circle given the chord length and height of a segment, 2013, StackExchange <https://math.stackexchange.com/questions/564058/calculate-the-radius-of-a-circle-given-the-chord-length-and-height-of-a-segment> (Year: 2013).*

(Continued)

*Primary Examiner* — Alison L Hindenlang
*Assistant Examiner* — Steven S Lee
(74) *Attorney, Agent, or Firm* — Paratus Law Group, PLLC

(57)    ABSTRACT
A method for economically mass-producing thin plate-shaped microchannel plate, includes: coating the surface of one or more strands of microfiber with a predetermined diameter with a polysilazane or polysiloxane binder; winding one or more strands of binder-coated microfiber onto a bobbin to form a microfiber bundle; curing the binder while the shape of the microfiber bundle is fixed; and slicing the binder-cured microfiber bundle to manufacture the plate.

13 Claims, 7 Drawing Sheets

(56)  References Cited

U.S. PATENT DOCUMENTS

| | | | | | |
|---|---|---|---|---|---|
| 2005/0122022 A1* | 6/2005 | Smith | ............... | H01J 43/246 313/105 CM |
| 2008/0063344 A1* | 3/2008 | Suzuki | ............... | G01C 19/722 385/114 |
| 2008/0265450 A1* | 10/2008 | Uchiyama | ............... | G02B 6/08 264/1.28 |
| 2009/0127995 A1* | 5/2009 | Rosine | ............... | H01J 43/246 445/60 |
| 2010/0170076 A1* | 7/2010 | Suzuki | ............... | G01C 19/722 29/458 |
| 2020/0109023 A1* | 4/2020 | Koshimizu | ............... | G02B 6/4457 |

FOREIGN PATENT DOCUMENTS

| | | | | | | |
|---|---|---|---|---|---|---|
| JP | H09113735 A | * | 5/1997 | | | |
| JP | 4567404 B2 | | 10/2010 | | | |
| JP | 6226865 B2 | | 11/2017 | | | |
| JP | 2020015601 A | * | 1/2020 | | | |
| KR | 830002198 B1 | * | 10/1983 | ........... | C03B 37/075 |
| KR | 10-2017-0048027 A | | 5/2017 | | | |
| KR | 101861817 B1 | * | 5/2018 | ............... | G02B 6/04 |

OTHER PUBLICATIONS

Korean Office Action for related KR Application No. 10-2023-0030990 mailed May 18, 2023 from Korean Intellectual Property Office.

M. A. Popecki et al., "Microchannel plate fabrication using glass capillary arrays with Atomic Layer Deposition films for resistance and gain", Journal of Geophysical Research: Space Physics, Aug. 12, 2016, pp. 7449-7460, vol. 121.

Michael J. Minot et al., "Pilot production & commercialization of LAPPD™", Nuclear Instruments and Methods in Physics Research A, Nov. 25, 2014, pp. 78-84, vol. 787.

* cited by examiner (a)

(b)

(c)

$$(R-a)^2 + \left(\frac{b}{2}\right)^2 = R^2$$

METHOD FOR MANUFACTURING MICROCHANNEL PLATE

CROSS-REFERENCE TO PRIOR APPLICATION

This application claims priority to Korean Patent Application No. 10-2023-0030990 (filed on Mar. 9, 2023), which is hereby incorporated by reference in its entirety.

BACKGROUND

The present disclosure relates to a method for economically mass-producing thin plate-shaped microchannel plate, which has a plurality of through holes, i.e., microchannels, with micro-unit diameters, densely aligned at a certain angle to the surface.

Microchannel plate (or capillary plate) is a substrate where a plurality of holes with uniform micro-unit diameters, penetrating from one side of the substrate to the other, are aligned at a certain angle to the surface. Conventionally, microchannels are aligned perpendicular to the surface, but depending on the application, they can be aligned at angles other than vertical, i.e., 90°. The thickness of commercially available microchannel plates ranges from 0.2 to 1.5 mm, and the diameter of the hole ranges from 1 μm to several hundred μm, with an open area ratio of 50% or more, allowing for high-density integration. Microchannel plates are used as filters for liquids or gases, exploiting the fact that particles larger than the diameter of the holes cannot pass through, or as window materials for UV light sources or X-ray sources in a vacuum, using the difficulty of gases passing through small holes with a high aspect ratio compared to light or X-rays. The high aspect ratio of the hole allows only parallel light to pass through the capillary structure. In field of optics, this feature is utilized for collimators as optical device testers and adjusters, and in mobile fingerprint recognition technology. The microchannel plate provides separate light channels, creating a cascade in which incident light, ions, or photons ionize the capillary wall, and the secondary electrons generated by the ionization form an electric field. This feature is used in optical devices such as electron multipliers for image enhancement, night vision devices, photomultipliers using scintillators for photon and particle detection, TOF (time-of-flight) devices like mass spectrometers, scanning electron microscopes, residual gas analyzers and so on. Recently, its applications have expanded to analysis in the fields of biology and medicine. With the expansion of these application areas, there is a need to develop methods for manufacturing that allow for greater open area ratios, finer channels, and are conducive to mass production.

Microchannel plates have been made since the 1960s essentially using a technique that involves repeated drawing and stacking. The conventional method for manufacturing microchannel plate is explained with reference to FIG. 1, which shows a method for manufacturing glass microchannel plate disclosed in Japanese Patent No. 4567404. First, (a) a core part (14) having a soluble section to acid is inserted into a cladding part (16) formed of a second material that is not dissolved in acid, and this is drawn to manufacture fiber (12). (b) The fibers (12) are stacked and aligned in a mold (20). After heating and fusing the aligned fibers, the mold is removed to obtain a bundle base material (22). (c) The bundle base material is drawn to form a bundle with reduced fiber diameters. This process of stacking and drawing in the mold (b), (c) is repeated until the desired fiber diameter is obtained. (d) Bundles drawn to form microchannel of the desired diameter are aligned inside a glass tube, then (e) it is heat-treated to be fused, obtaining the microchannel plate base material. (f) After slicing it to the desired thickness and angle, (g) microchannel plate precursor is obtained, and then (h) treating it with acid solution dissolves the core part within the channel, resulting in the manufacture of the microchannel plate, which can additionally undergo (i) a heat treatment process.

In step (a), if glass tubes are used instead of fibers with core and cladding parts, the etching process in stage (h) can be omitted.

The method according to the prior art requires repetitive drawing-stacking processes, which are labor-intensive and consequently raise manufacturing costs. There's also the problem of defects due to irregular alignment during the repetitive stacking process. Furthermore, as the diameter of the microchannels decreases, there's an issue with increased dispersion of the channels during the drawing of the bundle.

Additionally, there have been reports of methods for manufacturing microchannel plate using techniques such as laser-induced etching, photo etching, and photo-assisted electrochemical etching. However, these methods require expensive equipment or have low processing efficiency and limitations on the aspect ratio of the microchannels. Therefore, there is a demand for more efficient methods to manufacture microchannel plate.

SUMMARY

To solve the problems of the related art, it is an objective of the present disclosure to provide a method for manufacturing microchannel plate, which minimizes repetitive drawing and stacking processes to improve the dispersion of channel diameters and furthermore achieve a monodisperse distribution, minimizes defects due to alignment deviations, and enables economical mass-production of microchannel plate through continuous and automated process.

Another objective of the present disclosure is to provide a method for manufacturing large-area, uniform microchannel plate using the method of the present disclosure.

The technical problems that the present disclosure intends to solve will be clearly understood by those skilled in the art, even if not mentioned above.

To achieve the aforementioned objectives, the present disclosure is characterized by manufacturing large-area, uniform microchannel plate by minimizing manual drawing and alignment processes, which is done by winding one or more strands of microfiber onto a bobbin for alignment. Specifically, the present disclosure relates to a method for manufacturing microchannel plate wherein the microchannels are parallel and at a certain angle to the surface, comprising steps of: (A) coating the surface of one or more strands of microfiber with a predetermined diameter with a polysilazane or polysiloxane binder; (B) winding one or more strands of binder-coated microfiber onto a bobbin to form a microfiber bundle; (C) curing the binder while the shape of the microfiber bundle is fixed; and (D) slicing the binder-cured microfiber bundle to manufacture the plate.

In the present disclosure, the diameter of the microfibers used corresponds to the diameter of the microchannels in the microchannel plate, which can range from 0.1 to 500 μm, and more preferably from 0.5 to 30 μm, but is not limited to this range. These microfibers can have a rod-like structure, a hollow structure, or a core-shell structure, and can be made of materials such as polymer, metal, silicon, or glass. If the microfibers include one or more materials selected from polymers, metals, and silicon, step (E) of removing the polymer, metal, or silicon part of the microfibers from the plate should be added to form microchannels after step (D).

In step (B), by controlling the tension of the microfibers wound on the bobbin, the density of the microfibers can be made uniform regardless of their position in the microchannel plate. Furthermore, it is desirable to guide the position of the microfibers provided to the bobbin by a guide such that the cross-section of the sliced microfiber bundle in step (D) forms a regular arrangement of the microfibers in a circular or polygonal shape.

The curing in step (C) involves heat treatment in an oxidizing atmosphere or hydrothermal treatment to convert the binder into glass.

In the method for manufacturing microchannel plate of the present disclosure, the bobbin is designed to include a region satisfying the condition of the curvature radius R in the following formula, which allows control of the tolerance of the channel shape in the array of microchannels.

$$R \geq \frac{4a^2 + b^2}{8a}$$ Formula

Here, a is the tolerance threshold value of the distance between the midpoint of the straight line connecting the centers of the cross-sections of both ends of the microchannel and the center of the cross-sectional area at the ½ point of the microchannel. b is the thickness of the microchannel plate. Moreover, by utilizing shapes other than circular for the bobbin, such as elliptical or polygonal, the alignment of the microchannels can be more effectively controlled.

As described above, the method of the present disclosure allows the manufacturing of microchannel plate through a continuous, automated process that minimizes repetitive drawing-stacking processes, making it suitable for mass production.

Furthermore, the method of the present disclosure minimizes manual intervention and repetitive drawing-stacking processes, thus preventing defects due to incorrect alignment during the stacking process and suppressing the unevenness in the diameter of microchannels caused by drawing from the bundle state, providing microchannel plate of superior quality.

DETAILED DESCRIPTION

The present disclosure will now be described in more detail with reference to the accompanying drawings and embodiments. However, these drawings and examples are for illustrative purposes only to easily explain the technical concept and scope of the present disclosure and do not limit or change the technical scope of the present disclosure. It will be apparent to those skilled in the art that various modifications and changes can be made within the scope of the technical concept of the present disclosure based on these examples. Also, detailed descriptions of well-known technologies related to the present disclosure may be omitted if they are deemed to unnecessarily obscure the essence of the present disclosure.

Figure 2:
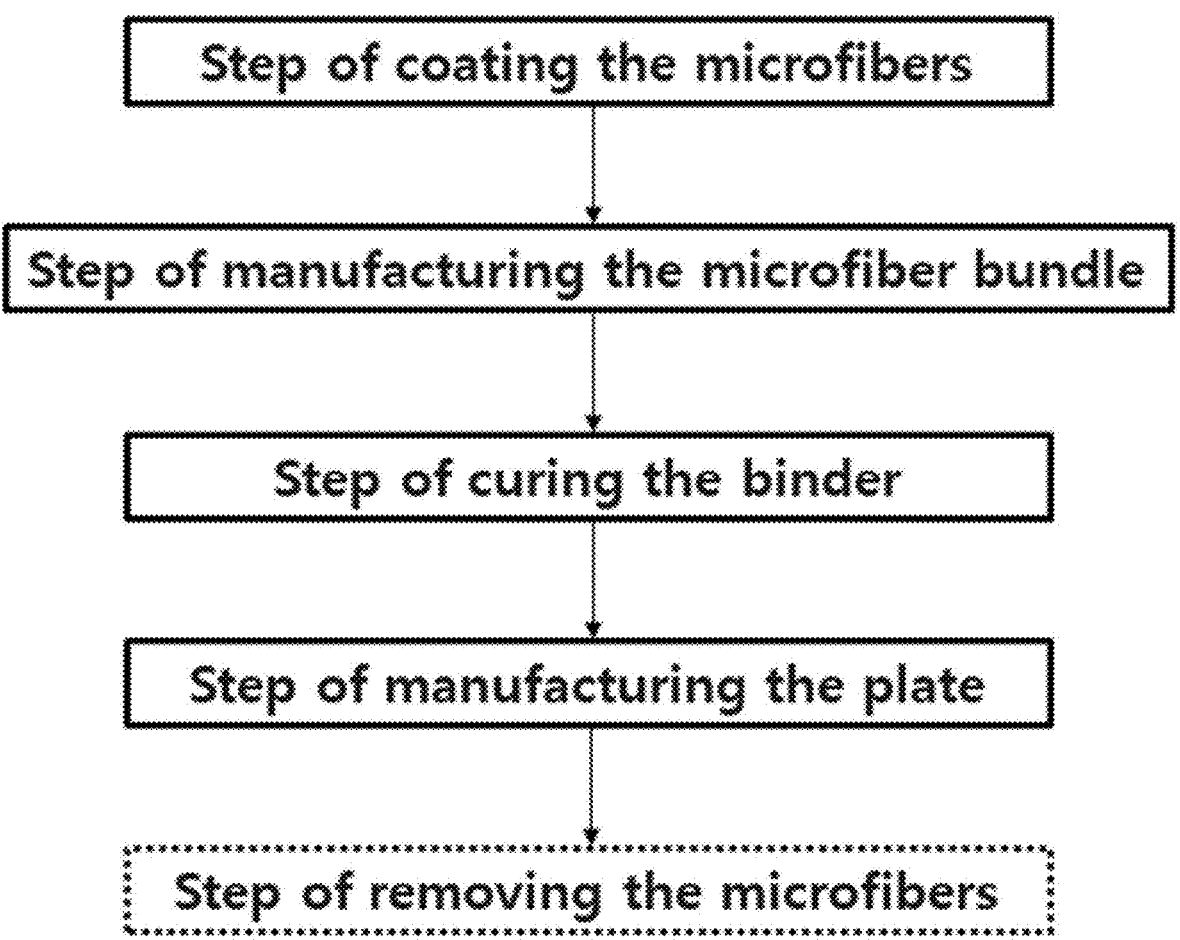
FIG. 2 is a flowchart of the method for manufacturing microchannel plate according to the present disclosure.

As previously described, the present disclosure relates to a method for manufacturing microchannel plate with microchannels aligned parallel to each other at a certain angle to the surface. The method is characterized by coating the surface of one or more strands of microfiber with a glass precursor binder to form bundle, and using a bobbin to ensure uniformity of the bundle while providing a continuous, automated process suitable for mass production. Specifically, the present disclosure, as illustrated in FIG. 2, comprises steps of: (A) coating the surface of one or more strands of microfiber with a predetermined diameter with a polysilazane or polysiloxane binder; (B) winding one or more strands of binder-coated microfiber onto a bobbin to form a microfiber bundle; (C) curing the binder while the shape of the microfiber bundle is fixed; and (D) slicing the binder-cured microfiber bundle to manufacture the plate.

Hereinafter, each step of the present disclosure is described in detail.

Step (A)

Figure 1:
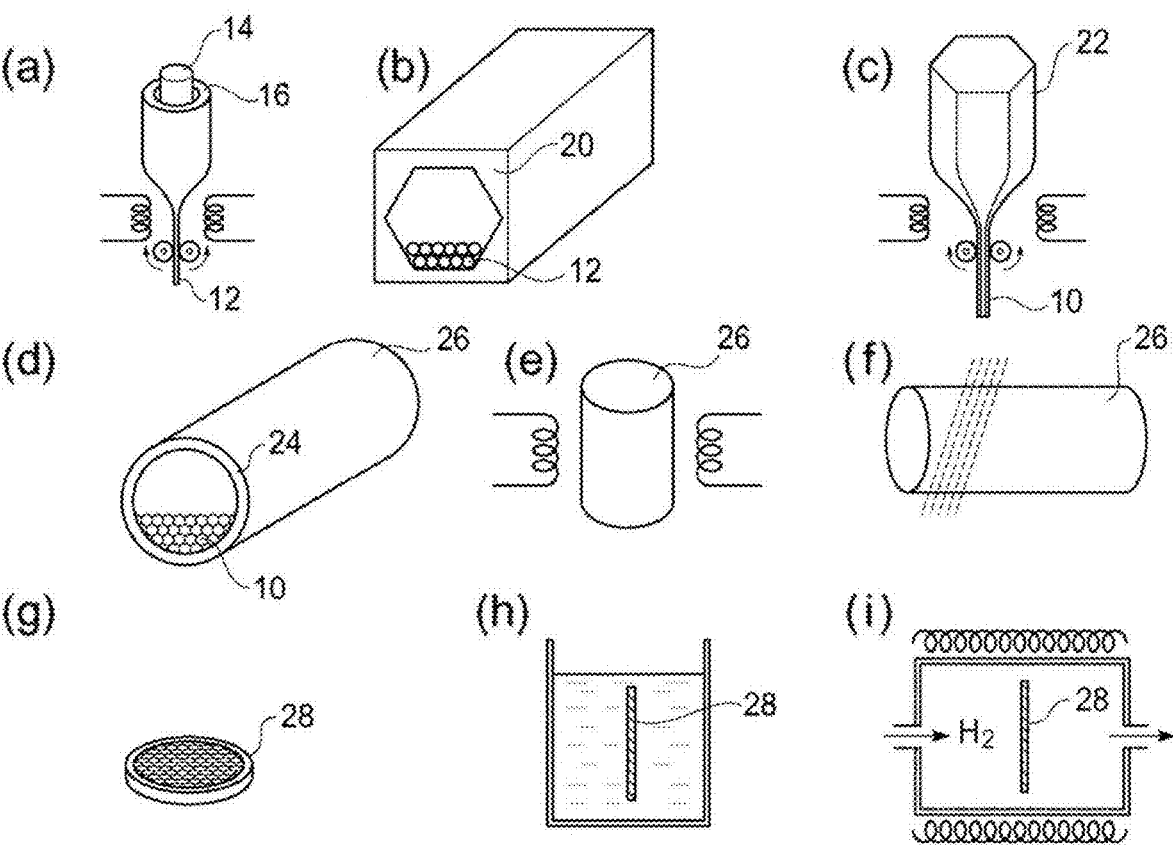
FIG. 1 is a diagram showing the manufacturing process of microchannel plate by the conventional technology.

In step (A), the surface of one or more strands of microfiber with a predetermined diameter is coated with a binder, which serves as a precursor to glass. Microfibers are often manufactured in the form of bundle through a spinning or drawing process. In this step, it is possible to use either a single strand of microfiber or multiple strands of microfiber in the form of bundle, so the microfibers manufactured in the form of bundle can be used as is without separating each fiber, or can be used partially separated. If the diameter of the microfibers is too small, making them mechanically weak and easily breakable or difficult to handle, they can be pre-manufactured into the form of bundle with a convenient mechanical strength or diameter for use. For example, the microfiber bundle manufactured in step (c) of the conventional technology, as explained with reference to FIG. 1, can be also used as multiple strands of microfiber in the form of bundle for step (A) of the present disclosure. If the thickness of the microfibers reaches several μm, even glass tubes can exhibit flexibility, and when used as multiple strands of microfiber in the form of bundle, their mechanical strength is further enhanced, making them suitable for use in the present disclosure. This represents an automation of some parts of the repetitive drawing and stacking processes that are labor-intensive in conventional technology.

In the present disclosure, "predetermined" refers to being already defined by the diameter of the microchannels in the microchannel plate being manufactured and does not obscure the content of the present disclosure. The microfibers, which will later form the microchannels, can be used with a diameter corresponding to that of the desired microchannels. In the present disclosure, the diameter of a microfiber refers to the diameter of its cross-section perpendicular to the longitudinal direction of the microfiber. Typically, the diameter of microchannels in the microchannel plate range from 1 to several hundred μm, and there is a trend towards further miniaturization of these channels. Therefore, it is preferable for the diameter of the microfibers to be between 0.1 and 30 μm, and more preferably between 0.5 and 3 μm, although this does not exclude diameters outside this range. Considering that the form of the microfibers later determines the shape of the microchannels, it is more desirable to use microfibers with low surface roughness. It is also beneficial to use materials that are cost-effective and environmentally friendly.

For instance, the microfibers may be of a hollow glass structure, i.e., capillaries. The glass precursor can be a material that transforms into glass upon heat treatment, such as polysilazane and polysiloxane.

Other possible materials for microfibers include polymers, metals, or silicon, but are not limited to these. Additionally, the microfibers can be made of a single material or more than one material. If the microfibers include materials other than glass, step (E) of removing the polymer, metal, or silicon part of the microfibers from the plate should be added to form microchannels after step (D). In this case, microfibers made of materials other than glass act as a sacrificial layer. As they are removed in step (E), microchannels are formed in their place.

The shape of the microfibers can be a rod-like structure with uniform cross-sectional composition, a hollow structure with an empty center, or a core-shell structure with different materials for the interior and exterior. Using a hollow structure can make the removal of the microfibers more efficient later. Alternatively, a core-shell structure can be utilized wherein the core is made of material with low heat or chemical resistance, and the shell forms a protective layer. The shell in the core-shell structure can also be made of glass or a glass precursor material. Glass precursors are materials that transform into glass upon heat treatment. These include materials such as polysilazane and polysiloxane, with flexible organic polysilazane or polysiloxane being more preferable. For core-shell microfibers with a shell of glass precursor, it's important to consider that the final diameter of the microchannels will correspond to the diameter of the core.

The surface of the microfibers is coated with a polysilazane or polysiloxane binder. The coating can be applied, for example, by dip-coating or spray-coating, but any method that uniformly coats the surface of the microfibers is acceptable. General aspects of coating, including the viscosity of the coating solution, are well established in the conventional coating technology field, so detailed explanations are omitted here. Polysilazanes and polysiloxanes are commonly used in semiconductor processes as precursors for laminating silicon oxide films that fill small gaps to form device separators. They easily react with oxygen and moisture through high-temperature heat treatment or hydrothermal treatment, decomposing or hydrolyzing into glass. If this step is performed by temporarily immersing the microfibers in a solution containing the coating liquid, or by spraying the solution while providing the microfibers to the bobbin during following step, no additional time is required for processing, which enhances process efficiency. The coating process can either involve a separate step to dry the coating liquid or proceed to the next step without drying the coating liquid.

In the present disclosure, when using microfibers as a sacrificial layer, the raw materials used for manufacturing bundle is microfiber with a thickness corresponding to the diameter of the microchannels. Therefore, unlike conventional technology that uses glass rods or tubes, this method does not require repetitive drawing-stacking processes.

Additionally, since the diameter of the microchannels is determined by the diameter of the microfibers, it is possible to manufacture plate with monodisperse microchannels of the desired diameter regularly aligned. In contrast, conventional technology requires drawing bundle of glass tubes or rods until microchannels of the desired diameter are formed, which can lead to variations in the diameter of the microchannels due to uneven heat distribution during drawing or differences in the force received depending on the position within the bundle.

In the case of using one or more strands of microfiber made of hollow glass, glass tubes (capillaries) or glass tube bundle manufactured by the conventional technology are stacked to the desired size by a continuous automated process, so that a part of the manual stacking process can be omitted, thus improving the dispersion and alignment of the microchannels' diameter, providing microchannel plate of superior quality.

Step (B)

Figure 3:
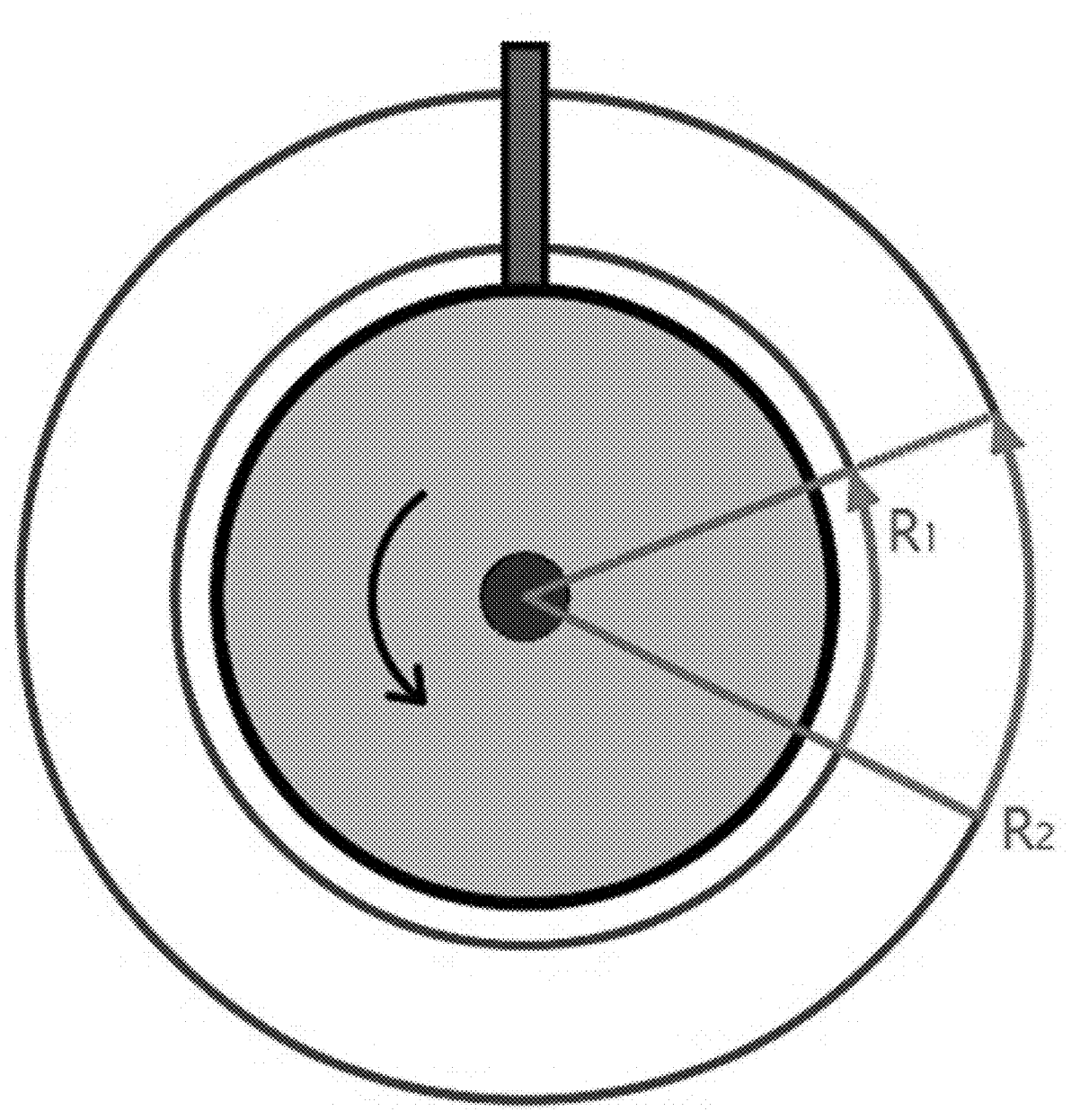
FIG. 3 is a diagram showing the increase in linear speed at the same rotation speed as the number of layers of microfibers increases.

Step (B) involves winding the microfibers coated with the binder in step (A) onto a bobbin to form a microfiber bundle. The microfibers wound onto the bobbin will later serve as a mold for the microchannels, so it is crucial to wind them at regular intervals. Therefore, maintaining a consistent tension of the microfibers being wound onto the bobbin in this step is desirable. If the tension is high, the microfibers are stacked more densely, whereas lower tension results in the microfibers being wound more loosely, ultimately leading to a lower density of the microfibers. Although manual winding of the microfibers onto the bobbin is not excluded, typically, the microfibers are wound onto the bobbin by rotating a motor connected to the axis of the bobbin while supplying the microfibers. The microfibers can be provided directly from spinneret or drawing device from which the microfibers are produced, or the pre-manufactured microfibers can be produced in separate bundles, distributed/stored, and provided from those bundles. As can be seen in FIG. 3, the effective radius of the bobbin increases as the microfibers are wound (stacked) onto it. Consequently, if the bobbin is rotated at a constant rotation speed, the linear speed later in the process will increase compared to the initial speed (i.e., since $r1<r2$, $2\pi r1/t<2\pi r2/t$), potentially increasing the tension and thus the density of the microfibers being wound onto the bobbin over time. Therefore, controlling the rotation speed of the bobbin or the supply speed of the microfibers to maintain a constant linear speed can keep the tension consistent. However, if the size of the microchannel plate is negligibly small compared to the size of the bobbin, significant deviations in density may not occur even without specific tension adjustments. Therefore, deciding whether to control the tension based on the size of the bobbin used and the size of the microchannel plate being manufactured would be obvious to those skilled in the art.

In the following diagrams, the shape of the bobbin, the thickness of the microfibers, the size of the microfiber bundle, etc., are set to arbitrary proportions for convenience in explaining the present disclosure and do not reflect actual scale. Therefore, for example, the thickness of the microfibers or the size of the microfiber bundle may be exaggerated compared to their actual size.

Figure 4:
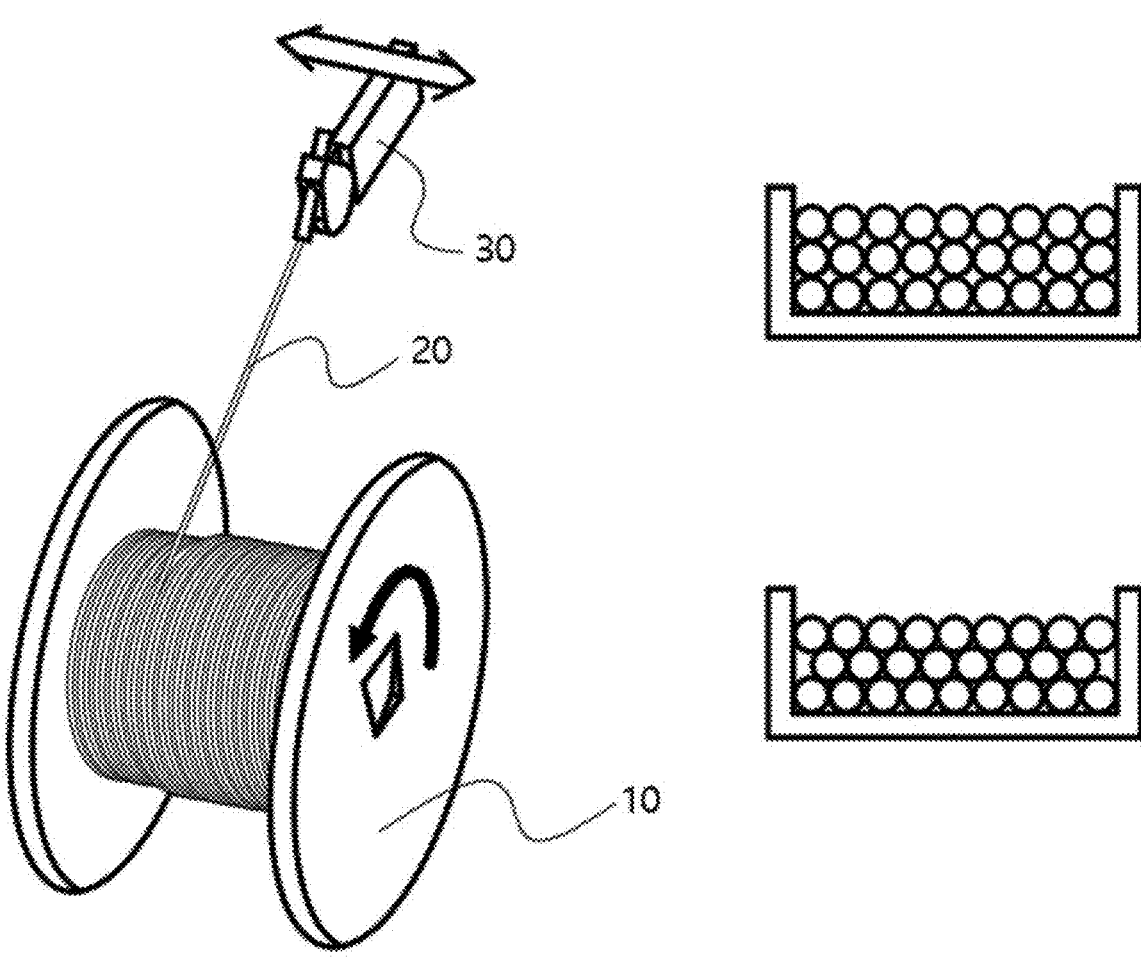
FIG. 4 is a diagram showing an example of the positioning of microfibers guided by a guide.

In this step, the shape of the microfiber bundle wound onto the bobbin determines the shape of the microchannel plate. Therefore, it is desirable to guide the position of the microfibers provided to the bobbin by a guide in this step so that when the microfiber bundle is sliced in step (D) below, the cross-section can match a desired shape of the micro-channel plate with regular arrangement of microfibers. FIG. 4 shows an example where the position of the microfibers (20) is guided by the guide (30). As illustrated in FIG. 4, the guide moves side to side, controlling the spacing between the microfibers. The guide not only controls the spacing and the outer surface shape of the cross-section of the microfiber bundle but also the method of stacking the microfibers. The right diagram in FIG. 4 shows an example of stacking, which can be simply layered or orthogonally layered, but is not limited to these methods. Synchronizing the guide with the rotation of the bobbin is preferable as it allows for more uniform spacing between the microfibers. In other words, controlling the tension, as mentioned above, may have the effect of controlling the spacing of the microfibers by controlling the number of layers, while the guide may have the effect of controlling the spacing of the microfibers in the same layer.

Figure 5:
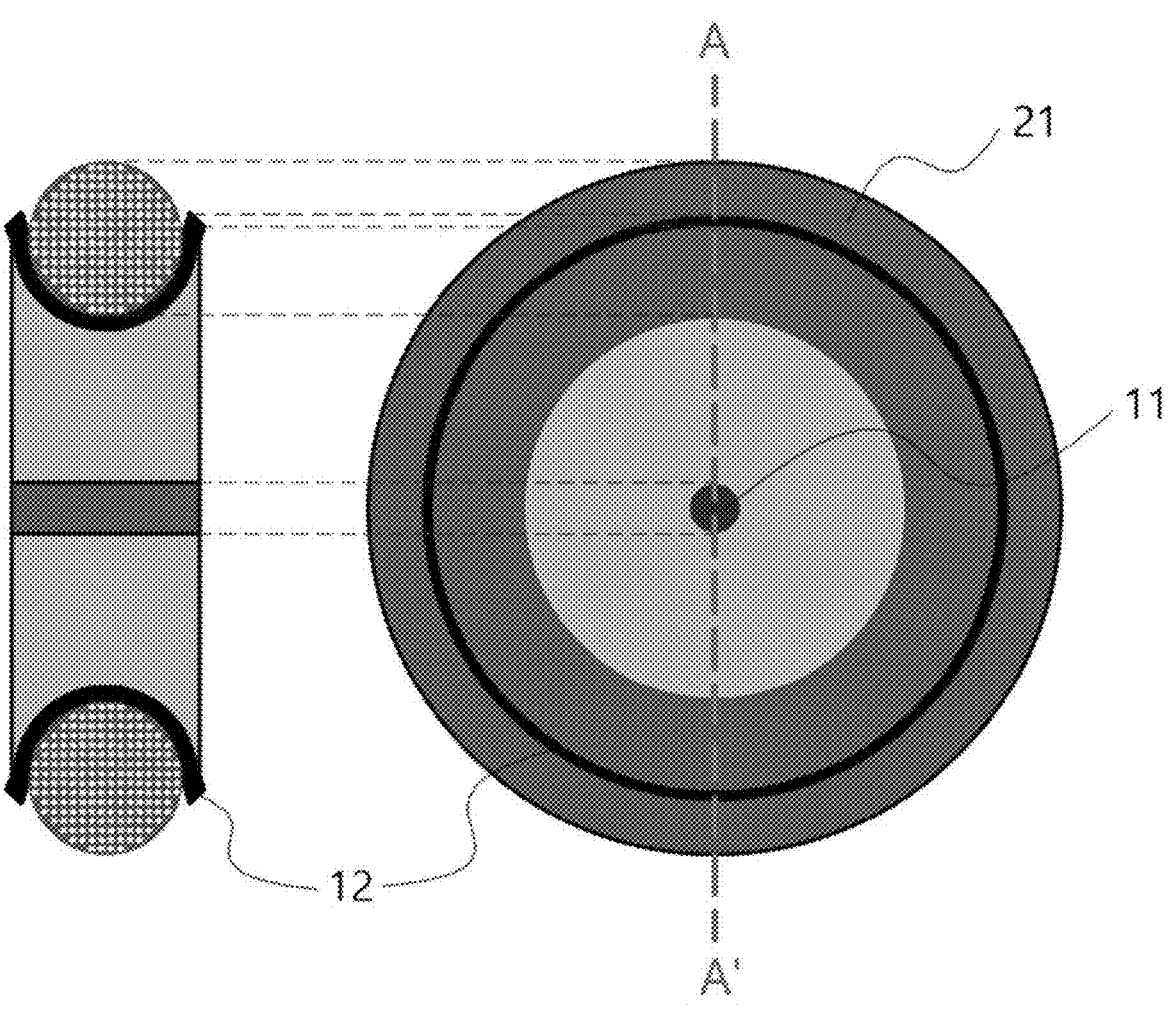
FIG. 5 is a diagram showing the structure of a bobbin according to an embodiment.

As previously mentioned, the cross-sectional shape of the microfiber bundle wound onto the bobbin (10) determines the shape of the microchannel plate. Obviously, this does not exclude cutting the fabricated microchannel plate to the desired size and shape for use. In the case of fabricating the desired shape without separate cutting process, it is desirable to determine the stacking shape of the microfiber bundle by considering the shape of the microchannel plate to be fabricated. For example, the stacking shape of the microfiber bundle can be circular or polygonal. In the present disclosure, the term 'stacking shape of the microfiber bundle' refers to the cross-sectional shape obtained when the micro-fiber bundle (21) is cut along a plane that includes the rotation axis (11) of the bobbin, as shown in A-A' in FIG. 5. If the stacking shape is circular or a polygon where the cross-section of the lower layer is narrower than the top, it may be difficult to stably wind the microfibers. In this case, to maintain a stable stacking shape of the microfibers, it is preferable for the outer surface (12) of the bobbin to have a concave structure rather than a flat one. The specific concave shape can be appropriately chosen depending on the stacking shape and, for example, can be matched to at least half of the cross-section of the final substrate. To achieve a circular stacking shape of the microfibers, as shown in FIG. 5, the concave shape can be semi-circular. Or, for a regular hexagonal stacking shape, the concave shape can be an inverted trapezoidal shape. Designing the concave shape of the outer surface according to the specific form should be straightforward for those skilled in the art.

Step (C)

This step involves curing the binder to prevent the microfiber bundle from becoming disarranged in subsequent steps. Before the binder is cured, the microfibers are simply arranged in a certain order, so it is necessary to cure the binder while maintaining this form. Curing the binder in this step may involve heat treatment in an oxidizing atmosphere or hydrothermal treatment of polysilazane or polysiloxane to vitrify them. Alternatively, curing the binder may simply involve adhering the microfiber bundle together, without the need for vitrification. As long as the shape of the microfiber bundle remains stable and does not get disturbed during the subsequent slicing step, it is not a problem if the binder is not vitrified at this stage. Especially if one of the subsequent steps includes a heat treatment step that elevates the temperature to the extent required for vitrification, it is unnecessary to treat the binder under harsh conditions for complete vitrification in this step. The preparation of glass by thermal decomposition or hydrolysis of polysilazane and polysiloxane is well documented in conventional technology under various conditions and environments, so specific details are omitted here.

As the binder cures in this step, the areas excluding where the microfibers are located either turn into glass or at least harden to form a robust structure. In the conventional technology, there is a problem that some microchannels are blocked or disabled due to fusion during the process of drawing the bundled glass tube or glass rod, while in the case of using microfiber as a sacrificial layer, the microfiber occupies the space of the microchannel part and prevents defects caused by fusion of the microchannel.

Step (D)

This step involves slicing the binder-cured microfiber bundle to manufacture the plate. The microchannel plate is characterized by having microchannels aligned parallel to each other at a certain angle to the surface, so it needs to be sliced at an angle corresponding to the angle between the microchannels and the surface. In many cases, the microchannels are aligned perpendicular to the plate surface, and in such cases, the slicing is done perpendicular to the direction of the microchannels.

It is natural to slice the slicing thickness to the thickness of the microchannel plate, but it is also possible to slice slightly larger than the size of the microchannel plate to account for additional processing such as polishing. In this step, the manufactured plate will have microfibers remaining at the positions of the microchannels.

Step (E)

This step is an additional process to form microchannels by removing the microfibers from the plate manufactured in step (D), applicable when the microfibers include materials other than glass. Obviously, if the microfibers are hollow glass, this step is not needed. Since microfibers other than hollow glass in the present disclosure are selected as sacrificial layers to be removed later, they can be removed using appropriate methods depending on the material.

For example, if the microfibers are made of polymer material, they can be dissolved using a solvent in which the polymer is soluble, or the polymer can be carbonized and removed by heat treatment. If the microfibers are metal, they can be dissolved using acid treatment. Microfibers made of silicon can be removed using commercially available etchants that selectively etch the silicon but not the glass, or a strong alkaline solution like TMAH (tetramethyl ammonium hydroxide). As such, depending on the type of microfibers used, they can be removed using appropriate methods without damaging the structure of the cured binder.

As the microfibers are removed, the areas where they were located become microchannels, resulting in the formation of the microchannel plate.

In the manufacturing process of the microchannel plate of the present disclosure, after step (D), if step (E) is additionally conducted, a polishing process can be added between steps (D) and (E) or after step (E). The polishing process has the effect of reducing the surface roughness of the glass portion to a certain level by polishing the sliced surface, and also makes the height of the microchannels uniform. Furthermore, if the polishing process is included after step (E), an additional cleaning process can also be included. The cleaning process involves removing impurities such as dust generated during the slicing step, residues from the removed microfibers, or solvents used in the microfiber removal step.

Figure 6:
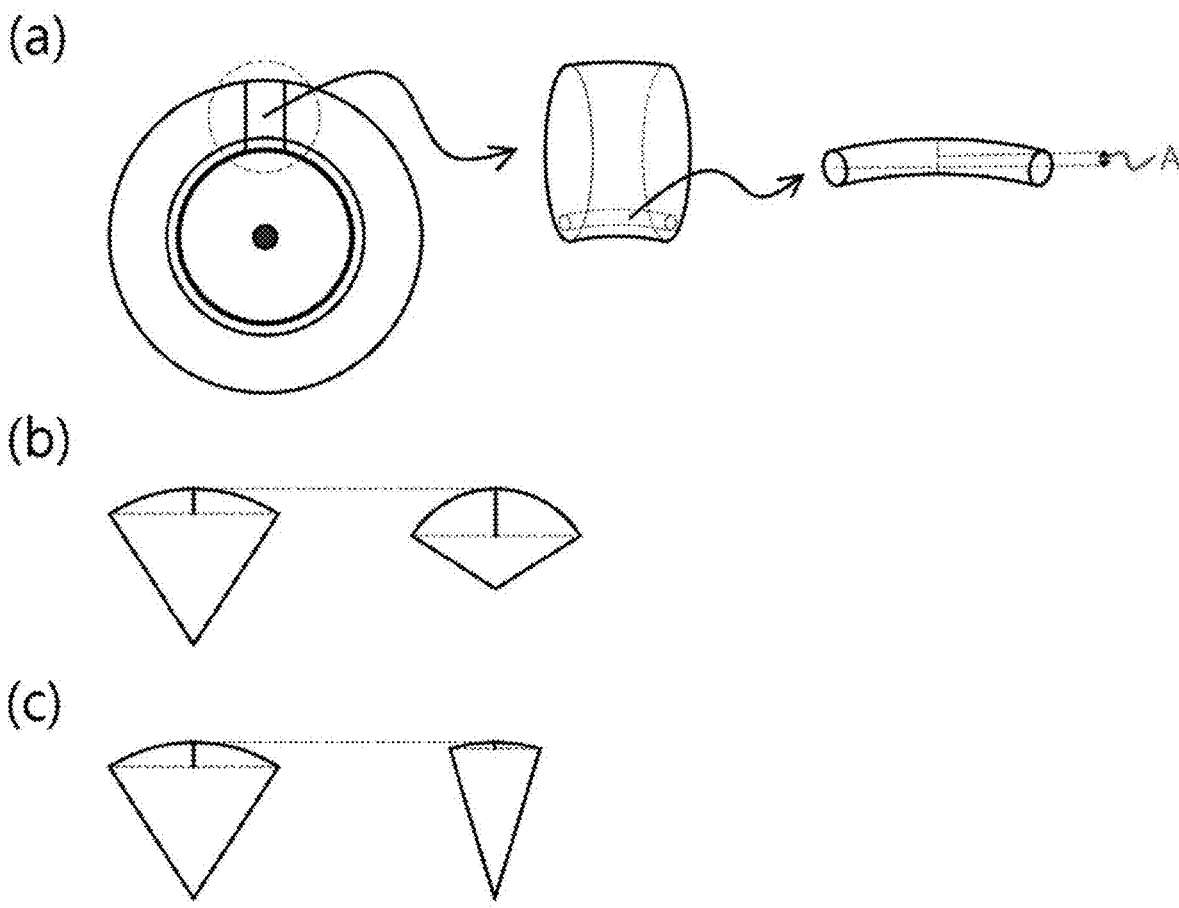
FIG. 6 is a diagram showing the relationship between the tolerance range of microchannels and the curvature radius of the bobbin.
Figure 7:
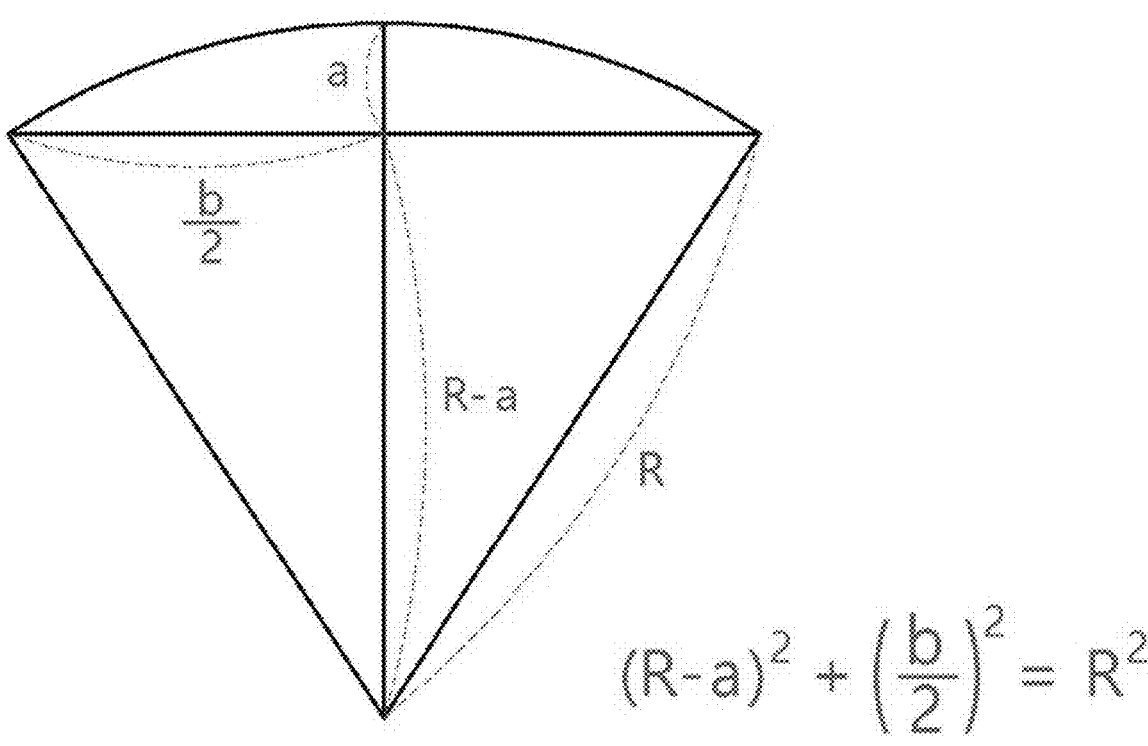
FIG. 7 is a diagram showing the relationship between the tolerance range of microchannels and the curvature radius of the bobbin.

As shown in FIG. 6, the longitudinal curvature radius of the microchannels in the microchannel plate of the present disclosure corresponds to the curvature radius of the bobbin. As shown in FIG. 6(*a*), the straightness of the microchannels, i.e., the degree of bending in the microchannels, can be measured by a variable A, representing the distance between the midpoint of a straight line connecting the centers of the cross-sections of both ends of the microchannel and the center of the cross-sectional area at the ½ point of the microchannel. FIG. 6(*b*) shows that for the same plate thickness, the larger the bobbin size, the smaller the A value. This suggests that straight microchannels can be formed if the curvature radius of the bobbin is sufficiently large. On the other hand, the longitudinal shape of the microchannels is also influenced by the thickness of the microchannel plate. FIG. 6(*c*) is a diagram showing the degree of bending in the microchannels in microchannel plates of varying thicknesses manufactured using a bobbin with the same curvature radius, indicating that the degree of bending in the microchannels can be negligible if the microchannel plate is very thin. As such, the degree of bending in the microchannels can be controlled by the curvature radius of the bobbin used in manufacturing and the thickness of the microchannels.

The tolerance range of the degree of bending in the microchannels can vary depending on the intended use of the microchannel plate. For example, in applications such as biological analysis or filtration, there may be more tolerance for the degree of bending in the microchannels. However, for optical applications, stricter standards might apply. If the tolerance threshold value a of the variable A is defined, and the thickness of the micro-panel plate is determined, the minimum radius of curvature of the bobbin can be obtained from the drawing in (c) of FIG. 6 by the following formula.

$$R \geq \frac{4a^2 + b^2}{8a}$$  Formula

Here, a is the tolerance threshold value of the distance between the midpoint of a straight line connecting the centers of the cross-sections of both ends of the microchannel and the center of the cross-sectional area at the ½ point of the microchannel, and b is the thickness of the microchannel plate.

For example, if the tolerance threshold value a is 0.5 μm and the thickness of the substrate is 1 mm, then according to the formula, R≥0.25 m. If a is 0.1 μm and the thickness of the substrate is 1 mm, R≥1.25 m. The smaller the tolerance threshold value is set, the better the straightness of the microchannels, which can be appropriately selected depending on the application of the microchannel plate.

Figure 8:
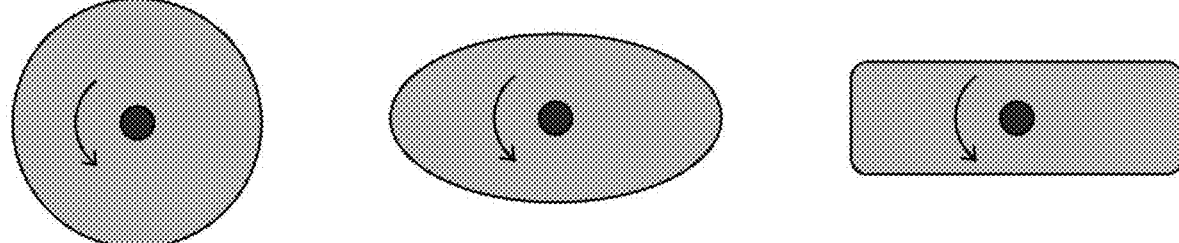
FIG. 8 is an example diagram of various bobbin shapes.

Therefore, to manufacture microchannel plate with microchannel straightness of the desired tolerance range, the bobbin should include an area that satisfies the condition of the curvature radius as determined by the formula. However, this does not imply that the bobbin must have a circular cross-section meeting the curvature radius condition over its entire area. If the tolerance for the degree of bending in the microchannels is very strict or if the thickness of the microchannel plate to be manufactured has to be thick, a circular bobbin might require a very large space. In such cases, a rectangular bobbin, which satisfies the curvature radius condition in many areas even if not in some, can be used. The present disclosure involves the use of highly flexible microfiber, so a rectangular bobbin with corners is not problematic for the method described. It goes without saying that bobbins are not limited to rectangles or circles, but can also be ellipses, polygons other than rectangles, or polygons with curvature at the corners. FIG. 8 illustrates various bobbin shapes that can be used in the manufacture of the microchannel plate of the present disclosure.

While a circular bobbin has a constant curvature radius throughout, elliptical or polygonal bobbins have varying curvature radius depending on the section. In such case, it is preferable that at least 70% of the sections satisfy the above formula, and more preferably at least 80%. For example, a bobbin used in the manufacture of the microchannel plate of the present disclosure should preferably have at least 70% of its section with a curvature radius of at least 1 m, and more desirably, with a curvature radius of at least 2 m.

For simplicity, let's consider the case of manufacturing a square microchannel plate with a side length of 1 cm using microfibers with a diameter of 1 μm. Assuming that the microfibers are stacked side by side, top to bottom, to produce a square substrate with a side length of 1 cm, $10^4$ strands in the horizontal direction must be stacked $10^4$ layers in the vertical direction, resulting in a microfiber bundle made of $10^8$ microfibers. In this case, the open area ratio would be 79%. In reality, there is a gap between the strands of microfiber. Assuming a commercialized microchannel with an open area ratio of 55%, approximately $7\times10^7$ microfibers would be required. Therefore, the number of microfibers wound on the bobbin in the present disclosure could be, for example, at least $10^7$, and more preferably at least $10^8$. However, the number of strands of microfiber can be appropriately adjusted depending on the size of the microchannel plate, the diameter of the microfibers, and the arrangement of the microfibers.

The microchannel plate manufactured by the above method can be used as is or undergo additional processing. That is, the microchannel plate can simply be cut to the required size for use, or the surface of the microchannels can be activated by treating with plasma. Alternatively, depending on the application of the microchannel plate, a substrate can be attached to one side perpendicular to the microchannels, and the outer surface parallel to the microchannels can be shelled with a glass or non-glass materials such as polymer.

DESCRIPTION OF REFERENCE NUMERAL

| | |
|---|---|
| 10: The bobbin | |
| 11: The rotation axis | 12: The outer surface |
| of the bobbin | of the bobbin |
| 20: The microfiber | |
| 21: The microfiber bundle | |
| 30: A guide | |

The invention claimed is:

1. A method for manufacturing a microchannel plate having microchannels that are parallel and at a predetermined angle to a surface of the microchannel plate, the method comprising:

(A) winding one or more strands of microfiber, each with a predetermined diameter, onto a bobbin to form a microfiber bundle;

(B) fixing a shape of the microfiber bundle; and (C) slicing the shape-fixed microfiber bundle to manufacture the microchannel plate and to generate end faces of the microchannels, wherein the one or more strands of microfiber are coated with a polysilazane or polysiloxane binder on surfaces thereof, and step (B) is performed by curing the binder.

2. The method of claim 1, wherein the curing involves heat treatment in an oxidizing atmosphere or hydrothermal treatment to convert the binder into glass.

3. The method of claim 1, wherein the predetermined diameter is between 0.1 and 30 μm.

4. The method of claim 1, wherein the one or more strands of microfiber are made of hollow glass.

5. The method of claim 1, wherein the one or more strands of microfiber have a rod-like structure, a hollow structure, or a core-shell structure, and include one or more materials selected from polymers, metals, and silicon, the method further comprising, after step (C), removing the polymer, metal, or silicon of the microfibers from the microchannel plate to form the microchannels.

6. The method of claim 1, wherein a tension of the one or more strands of microfiber being wound onto the bobbin in step (A) is maintained consistently.

7. The method of claim 1, wherein in step (A), a position of the one or more strands of microfiber provided to the bobbin is guided by a guide, such that a cross-section of the sliced bundle in step (C) forms a regular arrangement of the one or more strands of microfiber in a circular or polygonal shape.

8. The method of claim 1, wherein the outer surface of the bobbin is concavely shaped to match at least half of a cross-section of a final substrate.

9. The method according to claim 1, wherein a cross-section of the bobbin perpendicular to a rotation axis is circular, elliptical, or polygonal.

10. The method according to claim 9, wherein at least 70% of the outer surface of the bobbin has a radius of curvature of 2 m or greater with respect to the rotation axis of the bobbin.

11. The method of claim 1, wherein the microchannel plate includes $10^8$ or more end faces of the microchannels formed by the slicing in step (C).

12. The method of claim 1, wherein the bobbin has an outer surface including a region having a curvature radius R that satisfies the following formula:

$$R \geq \frac{4a^2 + b^2}{8a}, \qquad \text{Formula}$$

wherein a is a tolerance threshold value defined as a distance between a midpoint of a straight line connecting centers of end faces of each microchannel and a center of a cross-sectional area at a midpoint of each microchannel, and wherein b is a thickness of the microchannel plate.

13. The method of claim 1, wherein the one or more strands of microfiber have a rod-like structure, a hollow structure, or a core-shell structure, and include a sacrificial portion made of one or more materials selected from polymers, metals, and silicon, the method further comprising, after step (C), removing the sacrificial portion from the microchannel plate to form the microchannels.

\* \* \* \* \*